(12) United States Patent
Lindsay (10) Patent No.: US 7,273,201 B2
(45) Date of Patent: Sep. 25, 2007

(54) TILTABLE MOUNTINGS FOR PAYLOADS

(75) Inventor: Richard Arthur Lindsay, Eye (GB)

(73) Assignee: The Vitec Group PLC, Suffolk (GB)

( * ) Notice: Subject to any disclaimer, the term of this patent is extended or adjusted under 35 U.S.C. 154(b) by 227 days.

(21) Appl. No.: 10/507,901

(22) PCT Filed: Mar. 20, 2003

(86) PCT No.: PCT/GB03/01312

§ 371 (c)(1),
(2), (4) Date: Sep. 15, 2004

(87) PCT Pub. No.: WO03/081121

PCT Pub. Date: Oct. 2, 2003

(65) Prior Publication Data

US 2005/0156091 A1    Jul. 21, 2005

(30) Foreign Application Priority Data

Mar. 20, 2002  (GB)  .................................. 0206620.7
Nov. 8, 2002   (GB)  .................................. 0226153.5

(51) Int. Cl.
A47G 29/00    (2006.01)
(52) U.S. Cl. ........................ 248/371; 248/183.3; 108/7
(58) Field of Classification Search ................ 248/371, 248/372.1, 180.1, 181.1, 182.1, 183.1; 108/7, 108/8
See application file for complete search history.

(56) References Cited

U.S. PATENT DOCUMENTS

| | | | |
|---|---|---|---|
| 473,235 A | 4/1892 | Paullin | |
| 809,310 A * | 1/1906 | Long | 248/456 |
| 2,845,263 A * | 7/1958 | Gund | 267/173 |
| 4,085,634 A * | 4/1978 | Sattler | 82/19 |
| 4,444,284 A * | 4/1984 | Montemurro | 180/19.1 |
| 4,726,253 A * | 2/1988 | Russell | 74/569 |
| 4,771,979 A | 9/1988 | Nakazawa et al. | |
| 4,955,568 A * | 9/1990 | O'Connor et al. | 248/183.3 |
| 4,989,814 A * | 2/1991 | Uehara et al. | 248/183.3 |
| 5,408,899 A * | 4/1995 | Stewart | 74/513 |
| 5,515,062 A | 5/1996 | Maine et al. | |
| 5,605,101 A * | 2/1997 | Lindsay | 108/7 |
| 6,029,541 A * | 2/2000 | Schrick et al. | 74/604 |

(Continued)

FOREIGN PATENT DOCUMENTS

DE        37 14837        12/1988

(Continued)

OTHER PUBLICATIONS

PCT International Search Report dated Jul. 10, 2003 based on PCT/GB03/01312.

*Primary Examiner*—Korie Chan
(74) *Attorney, Agent, or Firm*—Patterson & Sheridan, L.L.P.

(57) ABSTRACT

A tiltable mounting as claimed in any of the preceding claims, wherein the lever has a conical shaped roller engaging the cam, the roller being mounted for rotation on the lever about an axis which passes through the pivotal axis of the lever and the conical surface of the roller having a projected apex which coincides with the pivotal axis of the roller to minimize sliding movement at the line of contact of the roller and cam as the roller moves over the cam surface.

17 Claims, 11 Drawing Sheets

U.S. PATENT DOCUMENTS

| | | | |
|---|---|---|---|
| 6,087,925 A * | 7/2000 | DeVolpi | 338/92 |
| 6,129,543 A * | 10/2000 | Potskhishvili et al. | 431/153 |
| 6,364,275 B1 | 4/2002 | Lindsay | |
| 6,416,024 B1 | 7/2002 | Lindsay | |

FOREIGN PATENT DOCUMENTS

| | | |
|---|---|---|
| GB | 2 102 757 | 2/1983 |
| WO | WO94/07080 | 3/1994 |
| WO | WO98/36208 | 8/1998 |
| WO | WO 00/43706 | 7/2000 |
| WO | WO 02/02988 | 1/2002 |

* cited by examiner

FIG. 1.

FIG. 6. MAX BALANCE CAPACITY (±90° RANGE) 45° TILT

FIG. 8. 50% BALANCE CAPACITY (±90° RANGE) 0° TILT

FIG. 9. 50% BALANCE CAPACITY (±90° RANGE) 45° TILT

FIG. 10. 50% BALANCE CAPACITY (±90° RANGE) 90° TILT

TILTABLE MOUNTINGS FOR PAYLOADS

This invention relates to tiltable mountings for payloads and is particularly, although not exclusively applicable to tiltable mountings for T.V./video cameras.

Many load counterbalancing mechanisms are known including hydraulic or pneumatic devices and springs loaded through lever or cam arrangements. Our UK Patent Specification No. 2102757 discloses a multiple spring and lever arrangement which provides true balance and is also capable of adjustment to accommodate different loads but is relatively complex and bulky and can therefore be difficult to accommodate. An important requirement of a counterbalancing mechanism and particularly mechanisms to be embodied in a tilt mounting for a camera is that the mechanism should be compact so that the overall bulk of the mounting can be kept to a minimum.

Our International Patent Publication No. WO-A-94/07080 discloses a tiltable mounting for a payload comprising a base and a support member for supporting the pay load. The support member is tiltable about a horizontal axis on the base for tilting about each side of a top dead center position about said horizontal axis. Torque generating devices are mounted on the base and act on the tiltable support to generate a torque in response to tilting of the support equal and opposite to the outer balance moment of the support with its payload to hold the support balanced in any position of movement about said axis. The tiltable support has two stub shafts on which the support is mounted for tilting about said horizontal axis and two torque generating units are provided which act on the respective stub shafts, each of which provides a torque which varies sinusoidally with displacement. A control is provided for adjusting the torque generating unit for varying the phase angle between the units to vary the collective amplitude of the torque developed by the units for any position of movement of the tiltable torque member to suit the weight of the payload on the support member.

Our International Patent Publication No. WO98/36208 discloses a rotary counterbalancing mechanism comprising an input rotatable about a horizontal axis for carrying a mass and means to generate a counterbalancing torque when the input is rotatably displaced from a neutral position in which the mass is disposed vertically above said horizontal axis. The means for generating the counterbalancing torque comprises a pair of aligned linearly moveable outputs, a cam to convert rotation of the input from said neutral position into sinusoidal displacements of said outputs which are 90° out of phase with each other between minimum and maximum displacement positions, and spring means for resisting said oscillating movement of the outputs away from said minimum displacement positions.

This invention provides a tiltable mounting for a payload comprising, a platform to receive the payload, a support, means to mount the platform for tilting movement on the support about a horizontal axis to either side of a neutral position in which the platform is disposed above the horizontal axis and spring driven means to control the tiling of the platform/payload to counterbalance the platform throughout its range of movement to either side of said neutral position, wherein said spring driven counterbalance means comprises a cam and cam follower arranged for relative movement with tilting of the platform with respect to the support, the cam follower comprising a pivotally mounted lever and linear spring means and means to convert rotation of the lever into linear input to the spring means to generate a spring force to resist tilting of the mounting, the shaping of the cam being such that the spring force generated in response to tilting of the platform counterbalances the platform/payload throughout a prescribed range of movement in either side of said neutral position.

It is an object of this invention to provide a fully counterbalance tiltable mounting in which the counter-balancing mechanism is compact and is readily adjustable to cater for payloads of differing weights and positions of center of gravity.

More specifically, the shaping of the cam may be such that the spring is displaced linearly in accordance with the function of θ/2 where θ is the absolute angle of tilt of the support from the neutral position where θ=0.

For example, the cam may be U-shaped being symmetrical about an axis through a base point of the U which defines a neutral position corresponding to the neutral position of the platform and the sides of the U being shaped to displace the cam follower with tilting of the support such that the spring is displaced in accordance with said sine function to provide corresponding resistance to tilting to counterbalance the support.

In any of the above arrangements the lever may act to compress the spring means with tilting of the support away from the neutral position.

Also in any of the above arrangements the lever may be pivotably mounted on the support and the cam is mounted to tilt with the platform.

Preferably, means are provided for adjusting the effective lever arm of the lever acting on the spring means to vary the moment imposed on the spring by the lever and therefore the corresponding counterbalancing force generated by the spring to cater for different payloads and positions of center of gravity of payloads on the support.

In the latter arrangement, the spring means may be mounted on the support and may have a load input member extending transversely to the line of action of the spring, the lever having a second follower mounted thereon which engages the load input member to input linear movement thereto in response to the tilting of the lever.

It is further preferred that second follower on the lever is movable linearly on the lever to adjust the moment applied by the lever to the spring means, the line of adjustment of the follower being such that when the platform is in the neutral position adjustment of the second follower does not apply force to the spring.

According to a further feature of the invention, the lever may have a conical shaped roller for engaging the cam, the roller being mounted for rotation on the lever about an axis which passes through the pivotal axis of the lever and the conical surface of the roller having a projected apex which coincides with the pivotal axis of the roller to minimize sliding movement at the line of contact of the roller and the cam as the roller moves over the cam surface.

The following is a description of a specific embodiment of the invention, reference being made to the accompanying drawings in which.

Figure 1:
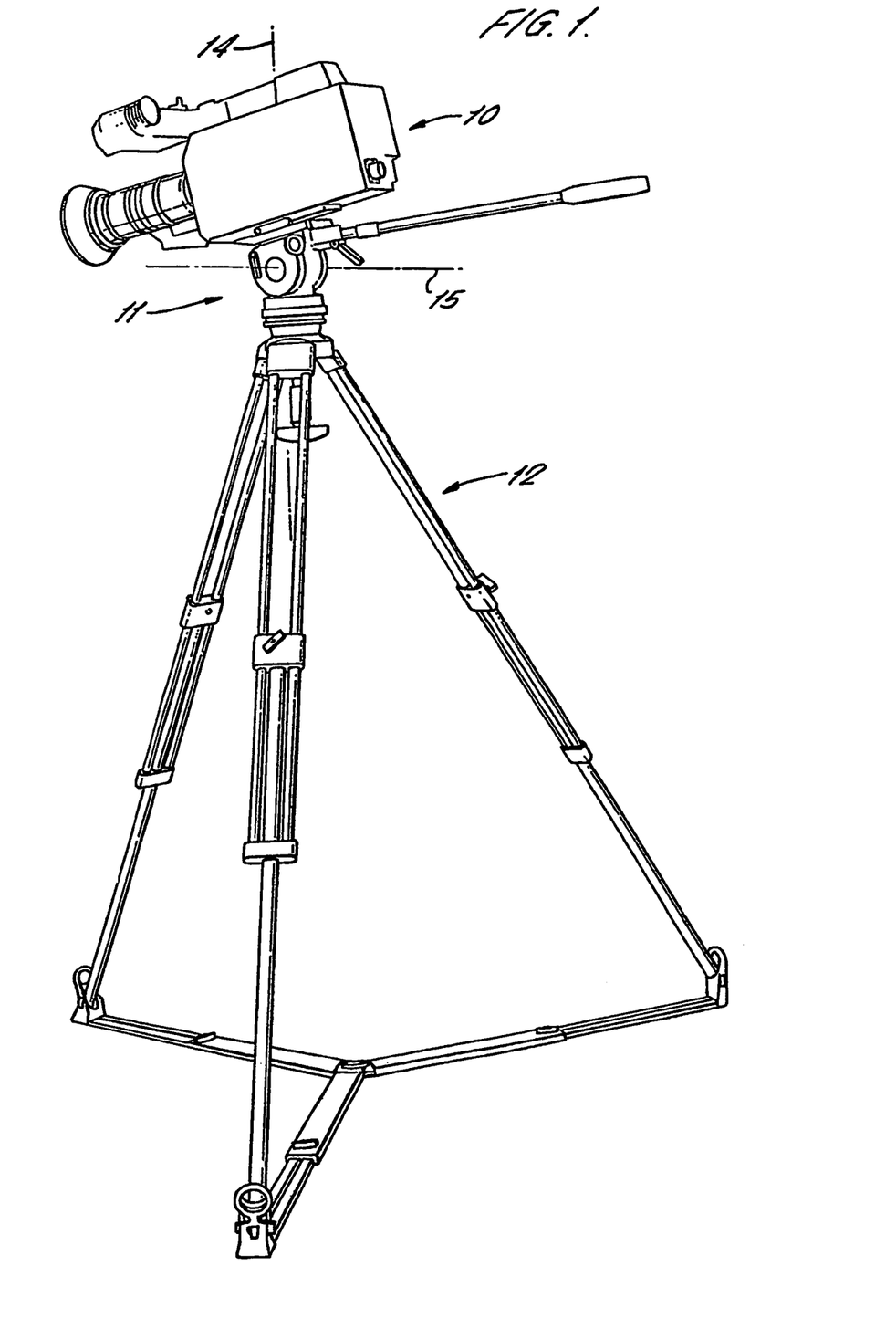
FIG. 1 is a perspective view of a pan and tilt mounting for a TV/video camera on a tripod stand.

Referring specifically to firstly to FIG. 1 drawings, there is shown a video camera indicated generally at 10 supported on a pan and tilt mounting 11 which is in turn mounted on a tripod stand indicated at 12.

The camera mounting includes a standard platform 13 to which the camera is secured by a conventional locking device. The mounting 11 permits pan and tilt movement of the camera on the platform about the axes indicated generally at 14 and 15 respectively. The mounting incorporates counterbalancing means for counterbalancing the platform over a range of tilt movement to either side of an upright neutral position so that the operator can move the camera to any required position of tilt and the camera will remain static in the selected position. The mounting also incorporates damping devices for damping pan and tilt movement of the camera to ensure that the operator can move the camera smoothly without detectable vibration throughout the ranges of pan and tilt movement permitted to allow the camera to record as it is moving without it being apparent to the viewer.

It will be appreciated that the mounting must cater for cameras of different weights and having centers of gravity at different positions above the platform so that different moments are imposed on the platform as the camera is tilted on the platform. The counterbalancing mechanism must therefore be adjustable to provide the requisite degree of resistance moment to the moment imposed upon the mounting by the tilting of camera from the neutral or upright position. It is also important that the counterbalancing mechanism provides exactly the required counterbalancing moment throughout the range of tilt movement of the camera to ensure that wherever the camera is moved to in the tilt mode, it is precisely counterbalanced and does not require a steadying hand from the cameraman to ensure that it remains in the selected orientation.

The detailed construction of the tiltable mounting and the counterbalancing mechanism in accordance with the present invention will be now be described in greater detail with reference to FIGS. 2 to 10.

Figure 2:
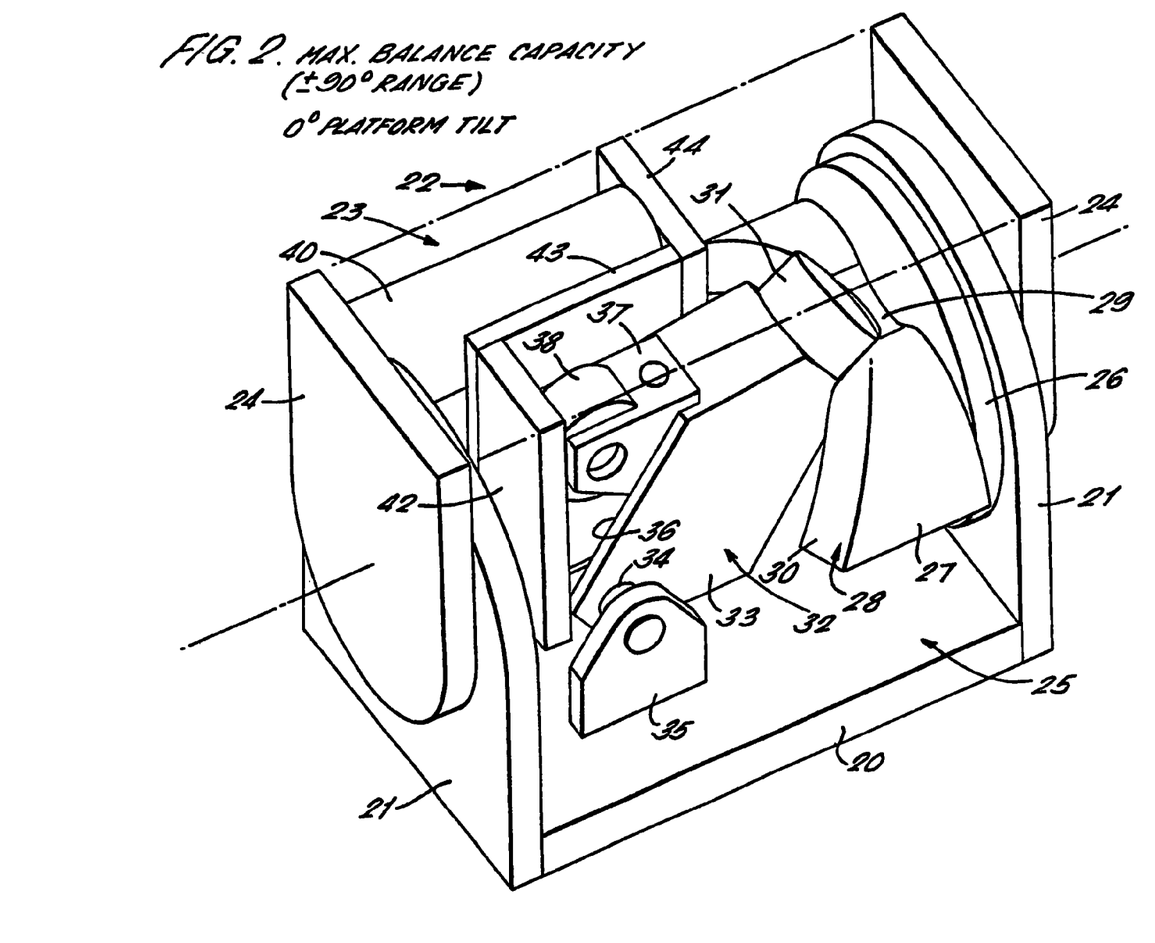
FIG. 2 is a perspective cutaway view of the tiltable mounting having a platform which is tiltable about a horizontal axis to either side of the upright neutral position shown with counterbalancing means (adjusted for maximum counterbalancing force) for counterbalancing the platform and payload throughout the range of movement.
Figure 3:
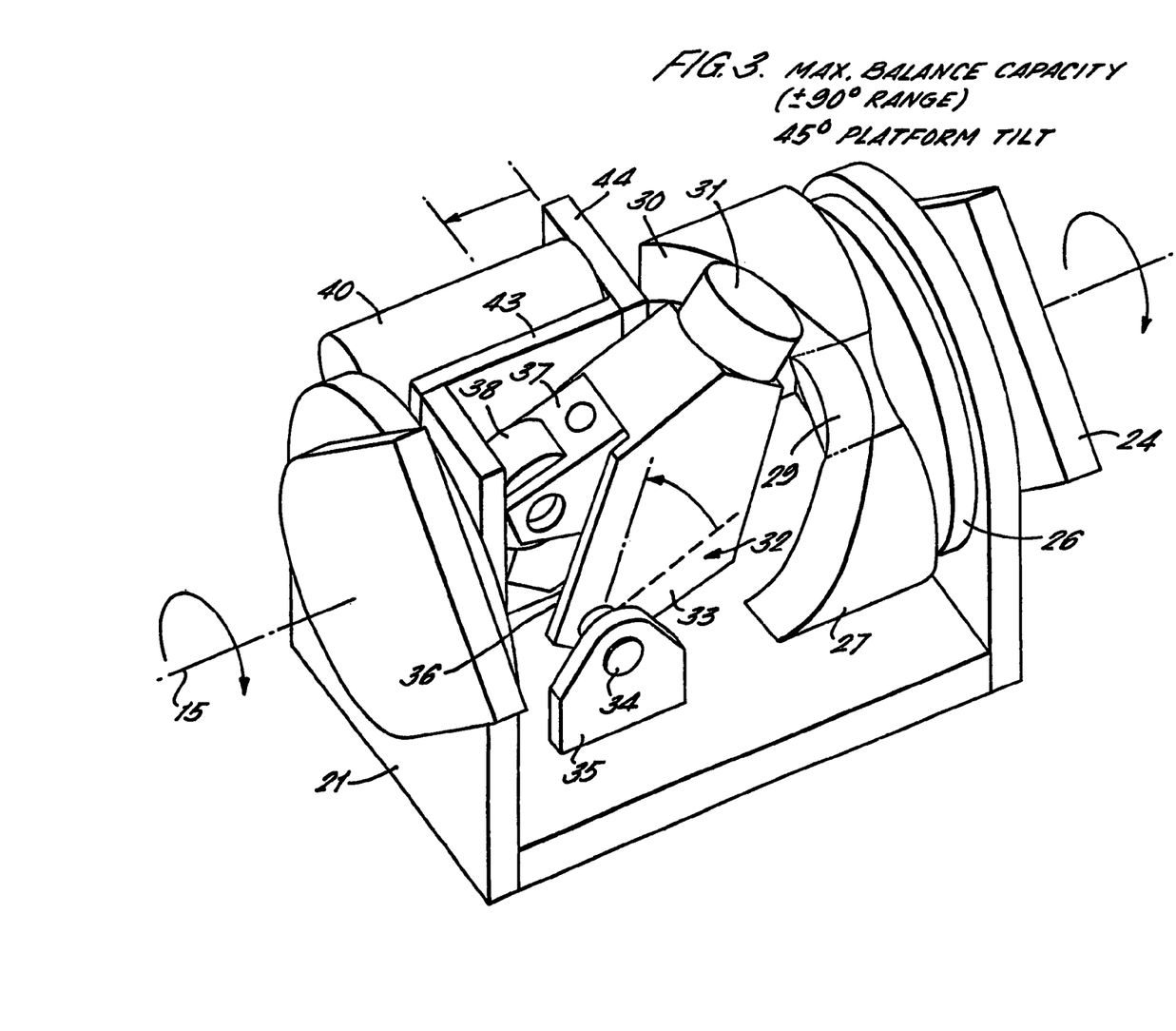
FIG. 3 is a similar view to FIG. 2 with the platform tilted to 45° from an upright position.

Referring firstly to FIG. 2, the mounting comprises an elongate base plate 20 which is supported on a part of the mounting not shown which provides pan movement of the camera about the vertical axis 14. The base plate has upright side plates 21 and a platform for the camera indicated generally at 22 pivotably mounted about the aforesaid horizontal axis 15 on the side plates 21 for tilt movement of the platform and camera supported on the platform. The platform comprise an upper horizontal plate 23 shown in outline only having downwardly extending side plates 24 which are pivotably mounted on the side plates. 21 of the base about the aforesaid tilt axis 15. The top plate of the platform carries the standard camera mounting plate referred to earlier.

The counterbalancing mechanism is mounted between the side plates 21 of the base as indicated generally at 25. To one end of the base, a hub 26 is mounted o n the inner side of side plate 21 to rotate with the platform. A cam form 27 is mounted on the hub having a cam face 28 which is of generally U shaped form having a central point 29 at the bottom of the cam about which the cam is symmetrical having mirror image faces 30 which rise symmetrically from the base point in the form of a U. The shaping of the faces will be described in greater detail later. When the platform is in its uppermost position, the base point of the cam face is disposed vertically above the tilt axis 15 of the platform.

The U-shaped cam is engaged by a cam follower in a form of a roller 31 mounted at one end of a fabricated box form lever 32, the side walls 33 of which are supported in trunnions 34 in turn mounted in lugs 35 upstanding from the base 20. The pivotal mounting of the lever 32 in the trunnions permits the lever to rise and fall as the cam 27 rotates with the platform and the roller 31 follows the cam surface 30 to either side of the base point.

The box form lever 32 provides an enclosed slideway 36 in which a mounting 37 carrying a roller 38 is located. A mechanism (not shown) is provided for adjusting the position of the mounting 37 lengthwise of the lever towards and away from the axis provided by the trunnions 34 about which the lever pivots. The purpose of the adjustment will be discussed later.

A pair of heavy compression springs 40 (only one of which can be seen) spaced apart are mounted side by on the side plate 21 remote from the hub 26 and extend horizontally on either side of the lever 32. The springs act on a carriage indicated generally at 41 which is mounted for linear sliding movement in the base 20. The carriage comprises a deep central channel section having an elongate vertically extending bottom wall 42 on which the roller 38 of the lever 32 runs, side walls 43 which flank the lever 32 and out-turned flanges 44 with which the springs 40 engage.

The mechanism operates as follows:

In the upright position of the platform 22 with the roller 32 of the lever engaging the base point 29 of the cam surface, the compression springs 40 are unstressed. As the platform 22 tilts about the axis 15 to either side of the neutral upright position, the roller 32 runs up one or other sides 30 of the U tilting the lever 32 at an anti-clockwise direction as shown in the drawings about the trunnions 34. The roller 38 of the lever bearing on the base plates 42 of the carriage forces the carriage in the direction at 52 on FIG. 2 compressing the springs 40. The shaping of the sides 30 of the cam is designed to cause the carriage 44 to move in accordance with a sinusoidal function determined by θ/2, where θ is the angle of tilt of the platform from the upright position. The shaping of the faces 30 of the cam embodies some variation from a true sinusoidal shape to cater for the geometry of the lever mechanism acting on the carriage. Subject to that, the movement of the carriage imparted to the springs 40 is a sinusoidal function of sine e as explained above. Given that condition, the platform can be fully counterbalanced throughout its range of tilting movement about the axis 15 by the springs 40 in accordance with the following mathematical analysis;

When mass M at radius R is tilted through angle θ, its loss of potential energy is MR (1-Cos θ)

For balance, this must be stored as spring energy.

Spring energy=½kx² where k is the spring rate and x is displacement from free length.

Therefore for balance $$MR((1-\cos\theta) = \tfrac{1}{2}kx^2$$

From which $$x = 2\sqrt{\frac{MR}{K}}\sin\left(\frac{\theta}{2}\right)$$

Figure 4:
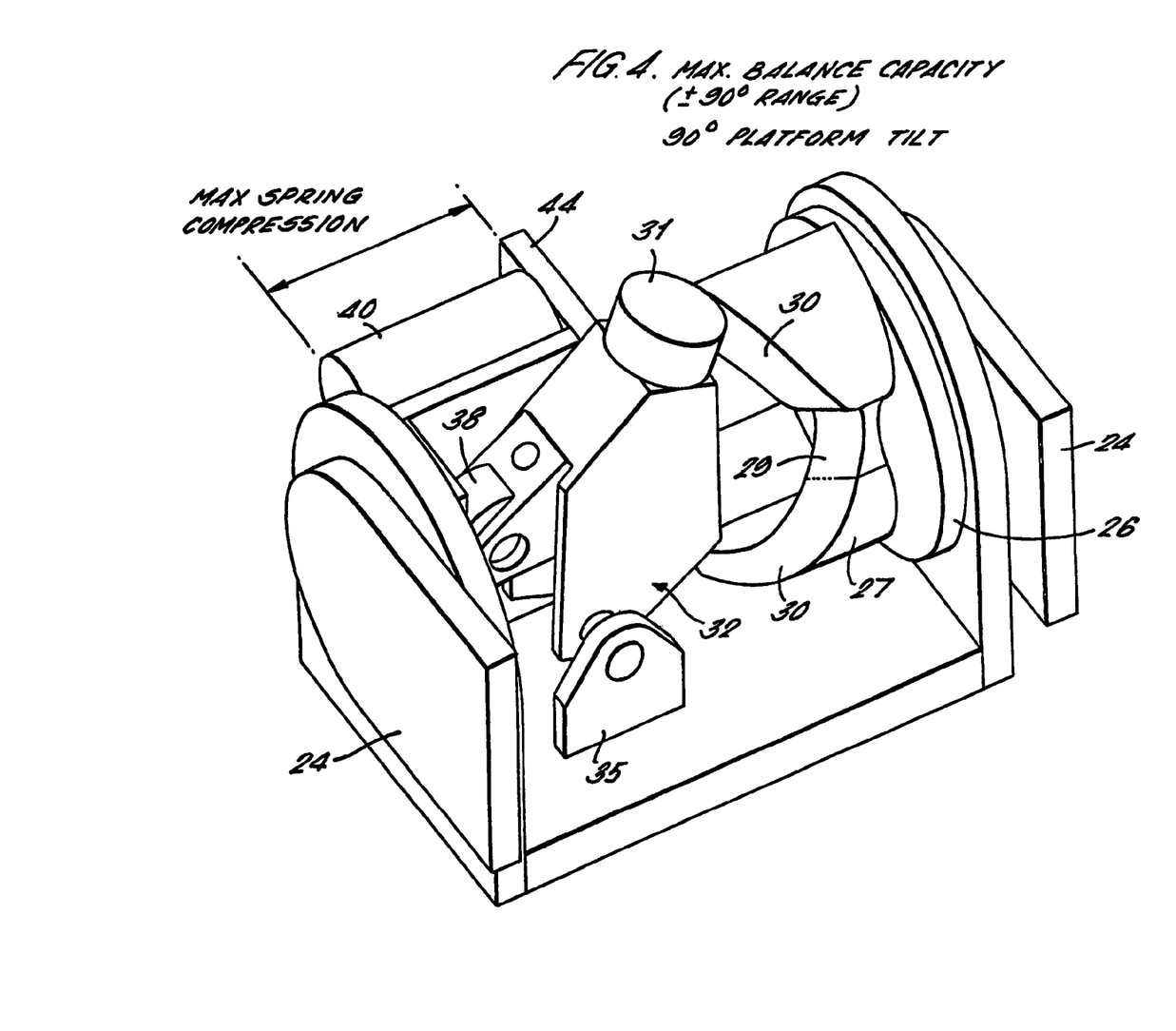
FIG. 4 is a similar view to FIG. 2 with a platform shown tilted to 90° from the upright position.
Figure 5:
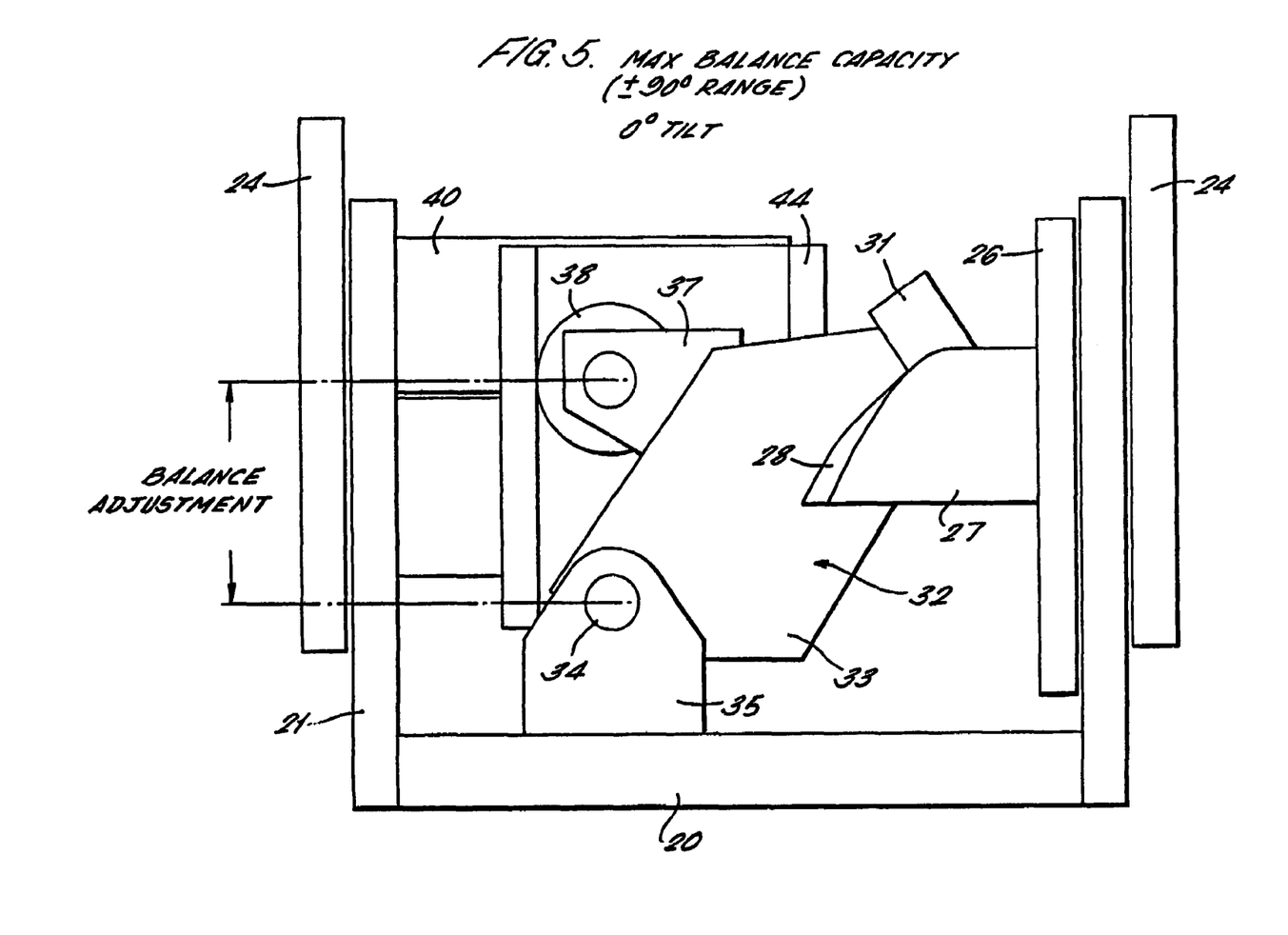
FIG. 5 is a side elevation view of the tiltable mounting of FIG. 2 with the platform shown in the upright position.
Figure 6:
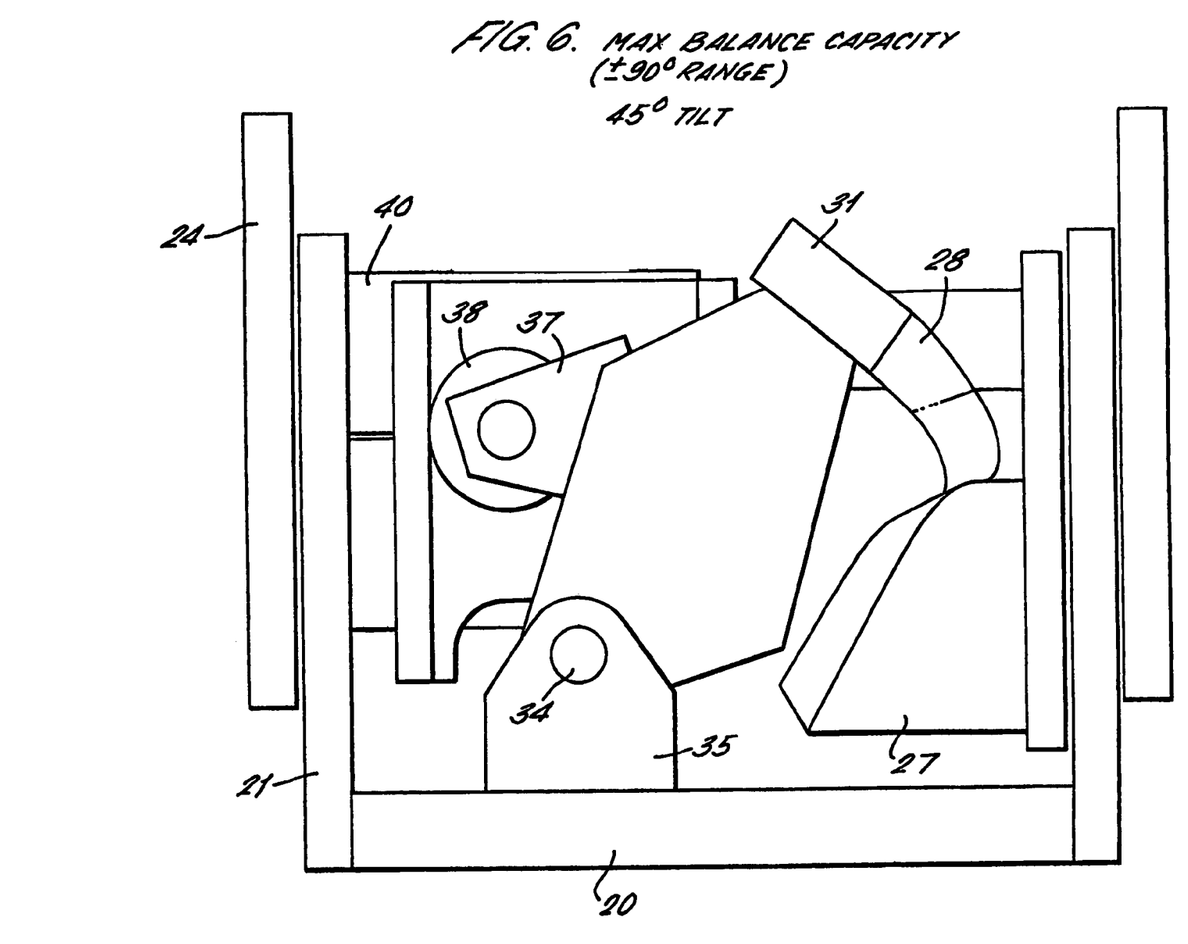
FIG. 6 is a similar view to FIG. 5 with a platform shown tiltable at 45° to the upright position.

It will be understood that the requisite counterbalancing force to be provided by the spring will depend on the weight of the camera located on the platform and the height of the center of gravity of the camera above the platform as a result of either a variation in the weight alone of the camera or the center of gravity. The moment imparted to the platform by the camera when the platform is tilted about the axis will vary. To cater for this, the mounting 37 on which the roller 38 is located is adjustable in the lever 32 towards and away from the trunnion axis 34 as explained earlier. FIG. 4 shows the range of adjustment with the platform in an upright position i.e. 0° of tilt and it will be noted that the mounting 37 for the roller 38 is adjustable vertically in the lever 32 with respect to the trunnions 34 so that with the lever in that position, adjustment of the mounting does not impose any force on the springs 40.

FIGS. 2 to 7 show the platform in the upright, 45° and 90° positions of tilt with the mounting 37 of the roller 38 at its uppermost position in the lever 32. That caters for maximum camera weight or height of center of gravity for the counterbalancing mechanism to generate a maximum counterbalancing force to tilt.

Figure 7:
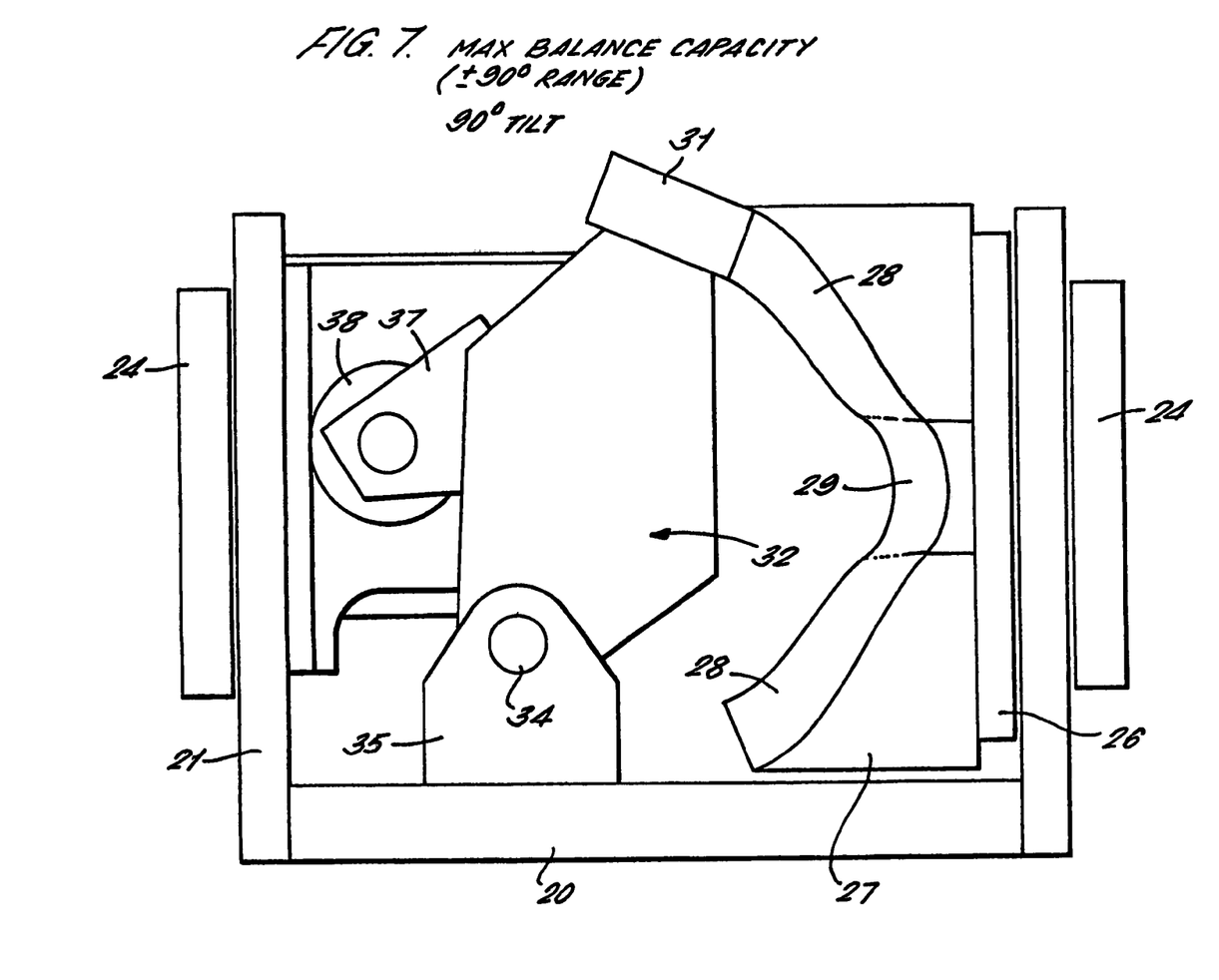
FIG. 7 is a similar view to FIG. 5 with a platform shown tiltable at 90° to the upright position.

In so doing the full available travel of the carriage is utilized so that at 90° tilt of the platform, the base of the carriage engages the side plate 21 of the base.

Figure 8:
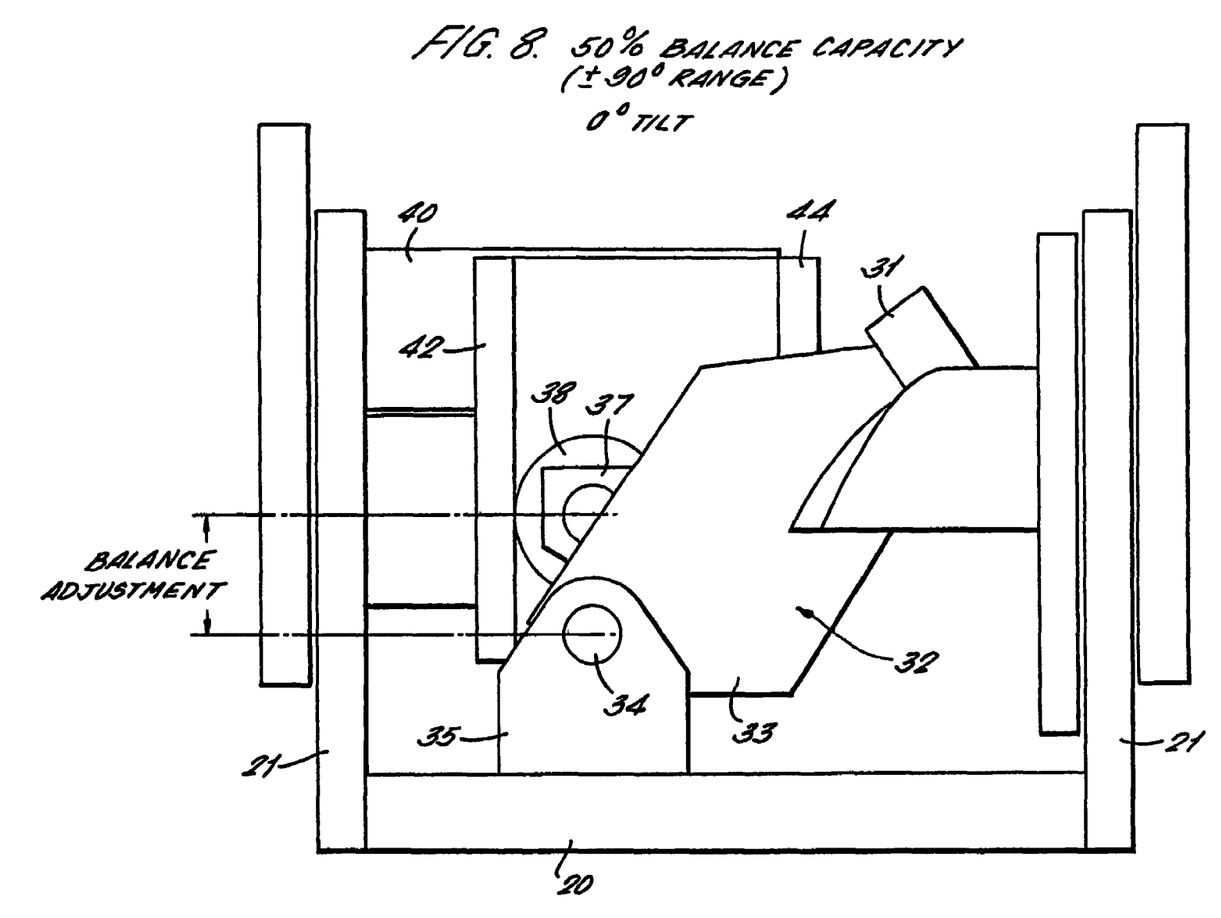
FIGS. 8 to 10 are side elevation views showing the counterbalancing mechanism adjusted for a minimum load with the platform upright, at 45° and 90° to the upright position respectively.
Figure 9:
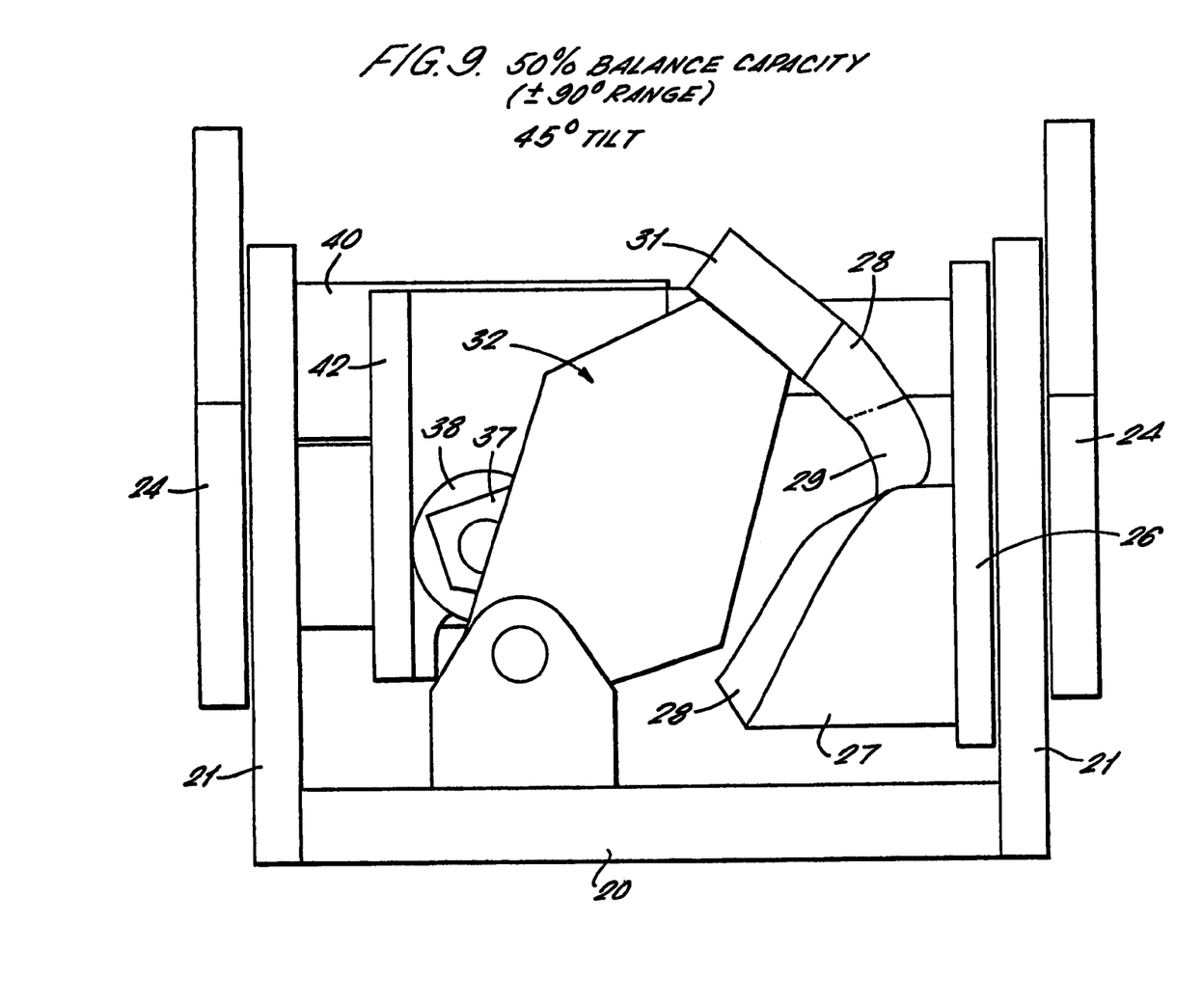
Figure 10:
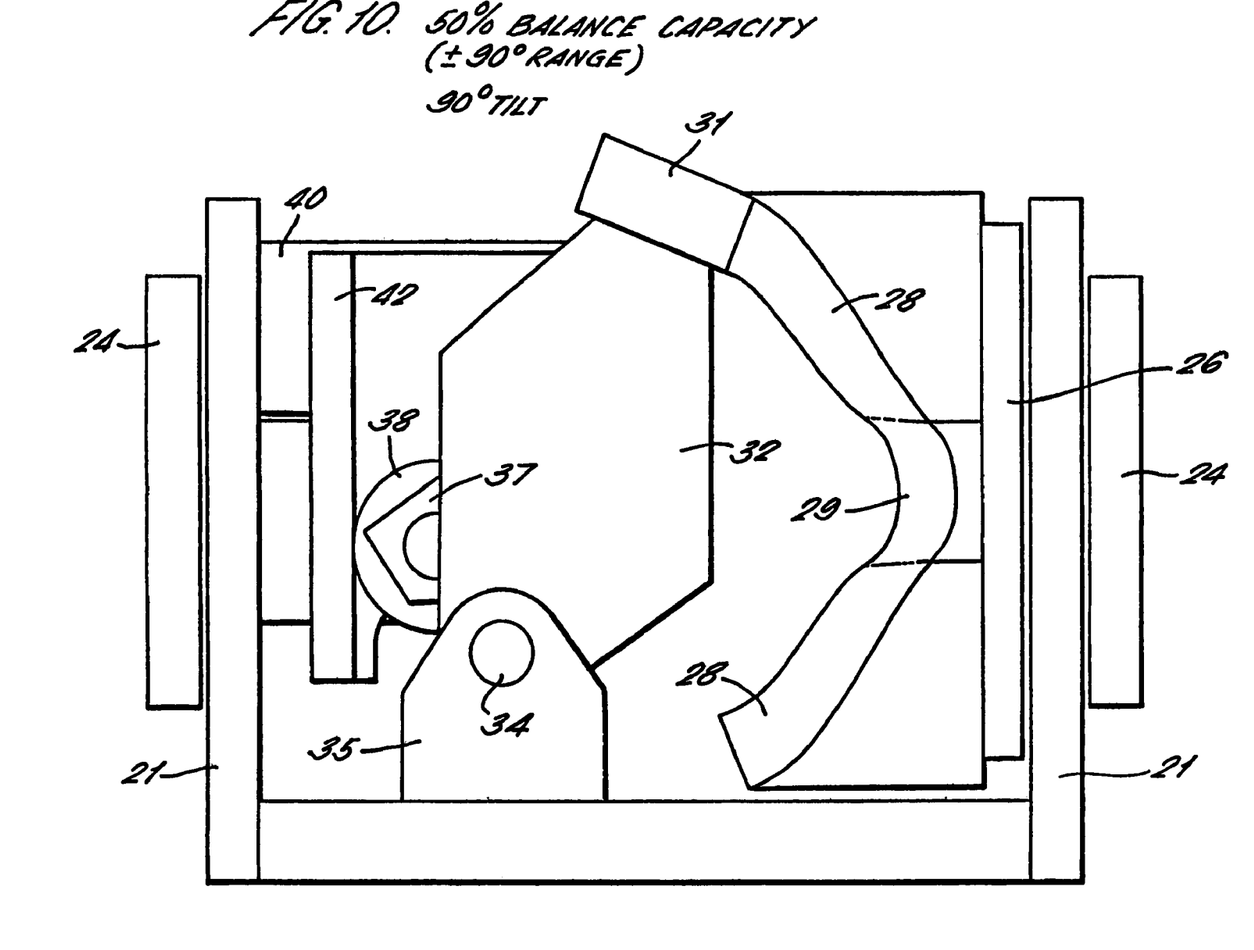

FIG. 8 shows a platform in its upright position with the mounting 37 adjusted vertically in the lever 32 to its lowermost position, that is closest to the trunnions 34. In this position, the carriage is defected by the lever by the minimum position throughout its range of flotation to generate the minimum counterbalancing moment for the lightest cameras or cameras of lowest centers of gravity. FIGS. 9 and 10 show the platform tilted at its 45° position and 90° position of tilt. The displacement of the carriage at the full tilt position of the mounting is rather less than maximum as can be seen by comparing FIG. 7 with FIG. 10.

Figures 11, 12:
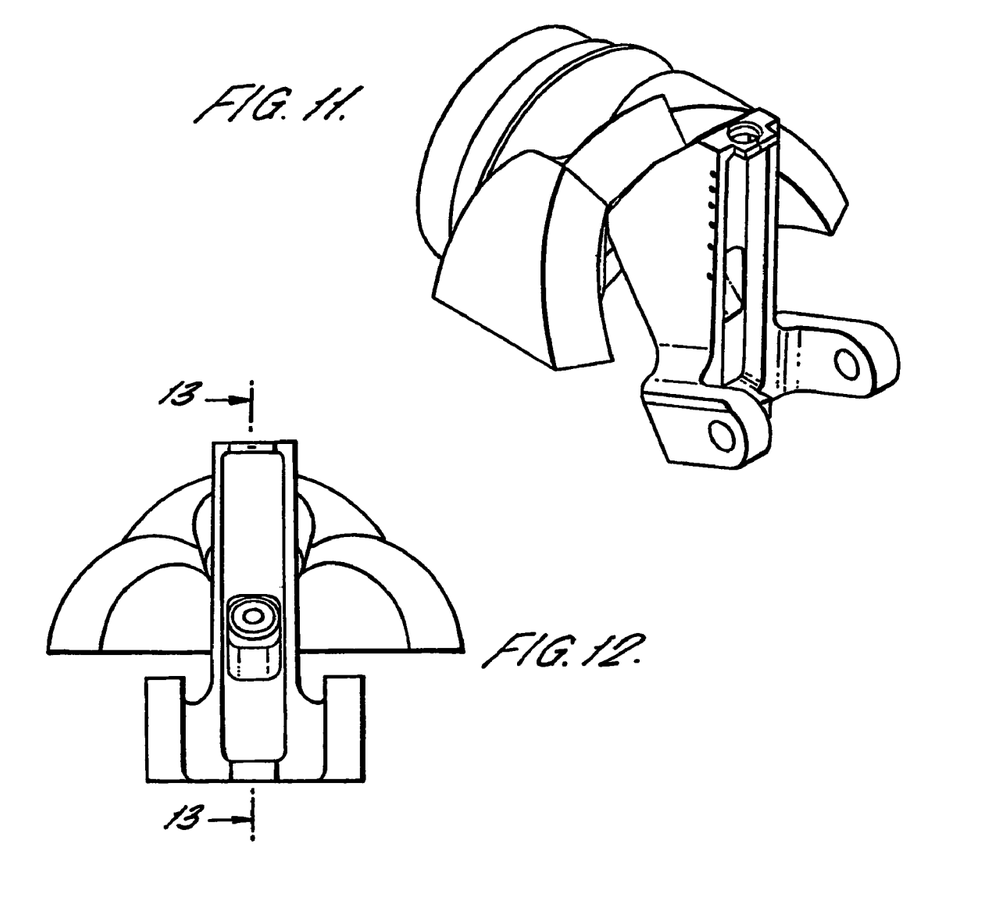
FIG. 11 is an isometric view of a modified form of cam follower and cam for use in the tiltable mounting.
FIG. 12 is a front elevation view of the cam follower and cam arrangement.
Figure 13:
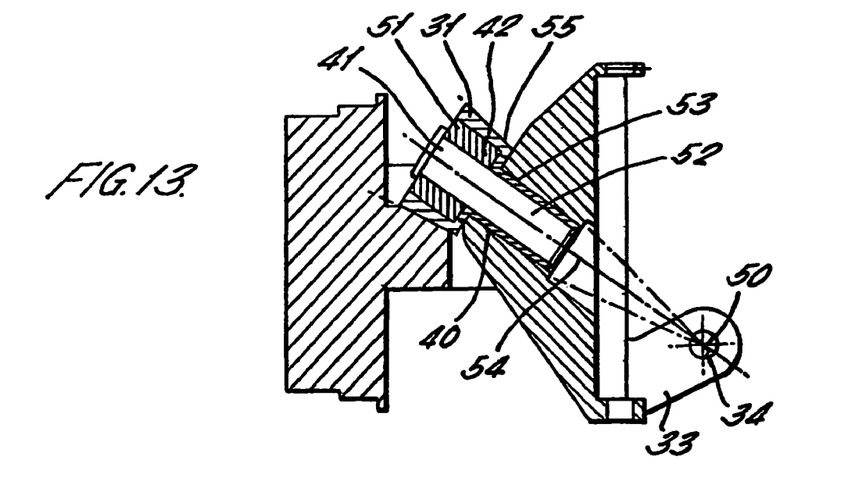
FIG. 13 is a section on the line 13-13 of FIG. 12.

Reference is now made to the arrangements of FIGS. 11 to 13. Like parts have been allotted the same reference numerals as used in the earlier embodiments. The cam follower in this case comprises a fabricated lever 32 having space parallel lugs 33 to receive spaced co-axial trunnions 34 supported on the base for pivotal movement of the lever about axis 50. The lever carries a roller 31 for engaging the cam face 30 as before. In this case, the roller 31 is supported on a needle-bearing 51 mounted on a spindle 52 supported in a socket 53 housed in the lever so that the roller 31 rotates on an axis 54 which passes through the axis 34 about which the lever pivots.

The roller 31 has a frusto-conical outer surface 55 which engages the cam face 30 and the frusto-conical surface has a projected fulcrum coincident with the axis 50 of the trunnion 54. This arrangement takes out relative sliding movement of the line of contact of the roller 31 with the cam 30.

The invention claimed is:

1. A tiltable mounting for a payload comprising, a platform to receive the payload, a support, means to mount the platform for tilting movement on the support about a horizontal axis to either side of a neutral position in which the platform is disposed above the horizontal axis and spring actuated counterbalancing means to control tilting of the platform/payload to balance the platform throughout its range of movement to either side of the said neutral position, wherein said spring actuated counterbalancing means comprises a cam which rotates with the platform, a cam follower engaging the cam and located on a pivotally mounted lever, linearly acting spring means to convert rotation of the lever into linear input to the spring means whereby a spring force generated in the spring means resist rotation of the cam and thereby tilting of the platform, the shaping of the cam being such that the spring means is displaced linearly in accordance with a function of sine θ/2 where θ is the absolute angle of tilt of the platform from the neutral position (in which θ is 0) so that the spring force generated in response to tilting of the platform counterbalances the platform/payload throughout a prescribed range of movement to either side of said neutral position.

2. A tiltable mounting as claimed in claim 1, wherein the cam is U-shaped being symmetrical about an axis through a U-base point which defines the neutral position and U-sides being shaped to displace the cam follower with tilting of the platform such that the spring means is displaced in accordance with said sine function to provide a corresponding resistance to tilting to counterbalance the platform.

3. A tiltable mounting as claimed in claim 1, wherein the lever acts to compress the spring means with tilting of the platform away from the neutral position.

4. A tiltable mounting as claimed in claim 1, wherein the lever is pivotally mounted on the support and the cam is mounted to tilt with the platform.

5. A tiltable mounting as claimed in claim 1, wherein adjusting means are provided for adjusting effective length of the lever acting on the spring means to vary the moment imposed on the spring means by the lever and therefore counterbalancing force generated by the spring means to cater for different payloads and positions of center of gravity of payloads on the support.

6. A tiltable mounting as claimed in claim 5, wherein the spring means has a load input member extending transversely to a line of action of the spring means, the lever having a second follower mounted thereon which engages the load input member to input linear movement thereto in response to tilting of the lever.

7. A tiltable mounting as claimed in claim 6, wherein the second follower on the lever is movable linearly on the lever to adjust the moment applied by the lever to the spring means, a line of adjustment of the second follower being such that when the platform is in the neutral position adjustment of the second follower does not apply a force to the spring means.

8. A tiltable mounting as claimed in claim 1, wherein the lever has a conical shaped roller engaging the cam, the roller being mounted for rotation on the lever about an axis which passes through a pivotal axis of the lever.

9. A tiltable mounting for a payload, comprising,
a platform to receive the payload;
a support;
a coupling between the platform and the support, wherein the platform is tiltable relative to the support about a horizontal axis to either side of a neutral position in which the platform is disposed above the horizontal axis; and
a counterbalance to control tilting of the platform/payload throughout a range of movement of the platform to either side of the neutral position, wherein the counterbalance, comprises:
 a linear biasing member having a first end fixed relative to the support;
 a cam rotatable in response to tilting of the platform; and
 a cam follower engaging the cam to move with the tilting of the platform,
  wherein the cam follower includes a lever pivotal relative to the support and in engagement with a second end of the biasing member, which resists linear movement converted from rotation of the lever to generate a spring force that resists the tilting of the platform based on shaping of the cam.

10. A tiltable mounting as claimed in claim 9, wherein the shaping of the cam is such that the biasing member is displaced linearly in accordance with the function of θ/2 where θ is the absolute angle of tilt of the platform from the neutral position in which θ=0.

11. A tiltable mounting as claimed in claim 10, wherein the cam is U-shaped being symmetrical about an axis through a U-base point which defines the neutral position with U-sides being shaped to displace the cam follower with the tilting of the platform such that the biasing member is displaced in accordance with the function to provide a corresponding resistance to the tilting that counterbalances the platform.

12. A tiltable mounting as claimed in claim 9, wherein the lever acts to compress the biasing member with the tilting of the platform away from the neutral position.

13. A tiltable mounting as claimed in claim 9, wherein position of the lever from a pivot point making the lever pivotal is adjustable to change an effective length of the lever acting on the biasing member to vary the moment imposed on the biasing member by the lever and therefore compensate for different payloads and positions of center of gravity of payloads on the platform.

14. A tiltable mounting as claimed in claim 13, wherein the biasing member has a load input member extending transversely to the line of action of the biasing member, the lever having a lever follower mounted thereon which engages the load input member to input linear movement thereto in response to pivoting of the lever.

15. A tiltable mounting as claimed in claim 14, wherein the lever follower on the lever is movable linearly on the lever to adjust the moment applied by the lever to the biasing member, the line of adjustment of the lever follower being such that when the platform is in the neutral position adjustment of the lever follower does not apply a force to the biasing member.

16. A tiltable mounting as claimed in claim 9, wherein the lever has a conical shaped roller engaging the cam, the roller being mounted for rotation on the lever about an axis which passes through a pivotal axis of the lever.

17. A tiltable mounting for a payload, comprising:
a platform to receive the payload;
a support;
means to mount the platform for tilting movement on the support about a horizontal axis to either side of a neutral position in which the platform is disposed above the horizontal axis; and
spring driven counterbalance means to control tilting of the platform/payload to counterbalance the platform throughout its range of movement to either side of said neutral position, wherein said spring driven counterbalance means comprises a cam and cam follower arranged for relative movement with tilting of the platform with respect to the support, the cam follower comprising a pivotally mounted lever and linear spring means mounted on the support and means to convert rotation of the lever into linear input to the spring means to generate a spring force to resist tilting of the mounting, the shaping of the cam being such that the spring force generated in response to tilting of the platform counterbalances the platform/payload throughout a prescribed range of movement to either side of said neutral position.

* * * * *